(12) United States Patent
Brunner

(10) Patent No.: US 9,644,536 B2
(45) Date of Patent: May 9, 2017

(54) INLET AIR FILTER ARRANGEMENT, INLET AIR FILTER CARTRIDGE, AND EQUIPMENT FOR SUPPORTING INLET AIR FILTER CARTRIDGES FOR A GAS TURBINE OR A COMBUSTION TURBINE

(71) Applicant: Amec Foster Wheeler North America Corp., Hampton, NJ (US)

(72) Inventor: David Brunner, Milton (CA)

(73) Assignee: AMEC FOSTER WHEELER NORTH AMERICA CORP., Hampton, NJ (US)

( * ) Notice: Subject to any disclaimer, the term of this patent is extended or adjusted under 35 U.S.C. 154(b) by 205 days.

(21) Appl. No.: 14/632,203

(22) Filed: Feb. 26, 2015

(65) Prior Publication Data
US 2015/0240720 A1    Aug. 27, 2015

Related U.S. Application Data

(60) Provisional application No. 61/944,826, filed on Feb. 26, 2014.

(51) Int. Cl.
*B01D 46/00* (2006.01)
*F02C 7/05* (2006.01)
(Continued)

(52) U.S. Cl.
CPC .............. *F02C 7/05* (2013.01); *B01D 46/002* (2013.01); *B01D 46/0005* (2013.01);
(Continued)

(58) Field of Classification Search
CPC .............. B01D 46/0005; B01D 46/002; B01D 46/2411; B01D 46/2414; B01D 2265/022;
(Continued)

(56) References Cited

U.S. PATENT DOCUMENTS 4,141,128 A * 2/1979 Wonderling ........... B01D 46/02
29/896.62
6,440,188 B1 * 8/2002 Clements ........... B01D 46/0005
55/341.1
(Continued)

OTHER PUBLICATIONS

Donaldson Brochure "Filter Pair Replacement Procedures for Pulsed (GDX) and Non-Pulsed (GDS) Filters."
Pneumafil Brochure "Pneuma-Pulse Cross Flow Cartridges."

*Primary Examiner* — Robert Clemente
(74) *Attorney, Agent, or Firm* — Fitzpatrick, Cella, Harper & Scinto

(57) ABSTRACT

An inlet air filter arrangement for a gas turbine or a combustion turbine includes a housing with an inlet side and an outlet side separated by a planar tubesheet including multiple tubesheet openings. Each multiple cylindrical filter cartridge includes a symmetry axis, an open end, and a closed end. A connection assembly for each of the multiple cylindrical filter cartridges seals the open end of the cylindrical filter cartridge to the tubesheet around one of the tubesheet openings. The connection assembly includes a mainly cylindrical guide sleeve including a symmetry axis, a shell with a cylindrical external surface, an inner end attached around the tubesheet opening and an outer end at the inlet side of the housing. The shell is provided with at least two slots extending mainly helically from the outer end towards the inner end. A collar attaches to the open end of the cylindrical filter cartridge.

17 Claims, 4 Drawing Sheets

(51) Int. Cl.
*F02C 7/052* (2006.01)
*B01D 46/24* (2006.01)

(52) U.S. Cl.
CPC .......... *B01D 46/2414* (2013.01); *F02C 7/052* (2013.01); *B01D 2265/022* (2013.01)

(58) Field of Classification Search
CPC ...... B01D 2201/301; B01D 2201/4015; F02C 7/05; F02C 7/052
See application file for complete search history.

(56) References Cited

U.S. PATENT DOCUMENTS

| | | | |
|---|---|---|---|
| 2005/0172590 A1* | 8/2005 | Burns | B01D 29/114 55/498 |
| 2008/0142425 A1* | 6/2008 | Hansen | B01D 46/0043 210/232 |

* cited by examiner

ION INLET AIR FILTER ARRANGEMENT, INLET
AIR FILTER CARTRIDGE, AND
EQUIPMENT FOR SUPPORTING INLET AIR
FILTER CARTRIDGES FOR A GAS TURBINE
OR A COMBUSTION TURBINE

CROSS REFERENCE TO RELATED
APPLICATION

This application claims the benefit of U.S. Provisional Application No. 61/944,826, filed on Feb. 26, 2014, which application is herein incorporated by reference.

BACKGROUND OF THE INVENTION

Field of the Invention

The present invention relates to an inlet air filter arrangement, to an inlet air filter cartridge, and to equipment for supporting multiple inlet air filter cartridges for a gas turbine or a combustion turbine.

Description of the Related Art

The operation of a gas turbine or a combustion turbine requires the ingestion of a large volume of ambient air. Filtration of the ambient air by using an inlet air filter system is required in order to protect the gas turbine or combustion turbine from the negative effects of contaminated air, which include foreign object damage, erosion, and turbine blade fouling. The inlet air filter system, which may be formed of different stages, usually comprises pulse cleaned or static filter cartridges.

Generally, the inlet air filter system comprises a housing with a tubesheet that separates the inlet side and the outlet side of the housing. The tubesheet typically comprises a large number of tubesheet openings, such as 300 to 1000 openings, each of which is associated with a filter cartridge. The filter cartridges have an open end sealed around the respective tubesheet opening and a closed end at the inlet side of the housing. The filter cartridges are usually conical or cylindrical cartridges, or combinations of these.

As a result of introducing an ambient air stream through the inlet filter system, particulate matter collects on the filter cartridges and tends to increase the flow resistance of the filter system. The filters can be cleaned by using, for example, a reverse gas pulse cleaning approach. In the reverse gas pulse cleaning approach, gas pulses, typically, air pulses, are introduced periodically against the direction of the normal air stream through the tubesheet openings into the filter cartridges. The gas pulses remove particulate matter collected on the inlet surface of the filter cartridges, which tends to reduce the flow resistance of the filter system. It is, however, eventually necessary to replace used filter cartridges by new ones. The required replacing frequency, which depends, for example, on the prevailing operating conditions and on the dust holding capacity of the filtration system, may vary from about one to about three years in the case of pulse cleaned filters, to as high as about one to about three times in a year in the case of static filters. The cost of the replacement filters, as well as the labor cost and logistic costs related to the replacement and transport of the filters, may thus be a significant part of the life cycle cost of a gas turbine or a combustion turbine plant.

According to a conventional method, gas turbine or combustion turbine inlet air filters are attached to the tubesheet by permanently installed support structures, such as yokes or tripods, which are supported by the tubesheet and extend to the inlet side of the housing within the interior of the associated filter cartridge. Filter support yokes are shown, for example, in the brochure "How to Service Filters on GDX & GDS Systems, GTS-501", available from the Internet page http://www.donaldson.com/en/gasturbine/support/datalibrary/index.html. A replacement filter cartridge is connected to the tubesheet by carefully sliding it on the support structure, and securing the closed end of the filter cartridge to the top end of the support structure so as to seal the open end of the filter cartridge to the tubesheet. Such a support structure make it possible to use simple filter cartridges without special elements for connecting them to the tubesheet. However, the installing of a new filter cartridge, which may, for example, consist of two pieces having a length of about 66 centimeters (26 inches), to the support structure is relatively complicated. There is also a risk of damaging the support structure or the filter cartridge, especially, the filter media, by accidental impact with the support structure. The protruding support structure is a potential safety hazard for maintenance personnel replacing the filter cartridges. The additional seal between the two cartridge pieces is a potential point of failure in the system and a potential path for particulates to bypass the filters and to damage the gas turbine or the combustion turbine. The loose hardware utilized to secure the filter cartridge to the support structure can potentially fail, or accidentally be left in the filter house, which could damage the gas turbine or the combustion turbine.

It is also known to connect the filter cartridges to the tubesheet by the aid of a connecting member of the filter cartridge protruding from the open end of the filter cartridge. The tubesheet then comprises complementary connecting elements enabling the fixing of the filter cartridge to the tubesheet. The connecting member of the filter cartridge may consist of separate connecting wings or a sleeve with helical slots, which wings or slots are then connected to corresponding studs in the connection elements of the tubesheet openings. An example of a filter cartridge with connecting wings protruding from the open end of the filter cartridge is shown in the brochure "Pneuma-Pulse Cross Flow Cartridges", available from the Internet page http://www.pneumafil.com/gas_turbine_inlet_air_filtration/category/literature. A disadvantage of this connection mechanism is that the connection member protruding from the open end of the filter cartridge increases the length of the filter cartridge, which gives rise to increased logistical costs of the replacement. The protruding connecting member may also be damaged during the transport and installation of the filter cartridges, and is also a potential safety hazard as the protruding connecting member may accidentally contact installation personnel. Also, the connecting member in the filter cartridge increases the material costs and the manufacturing costs of the filter cartridge by an amount that is significant due to the high number of the replaced filter cartridges. Also, the connecting members in this connection mechanism are individually attached to the open end of the filter cartridge, which provides minimal structural support when the filters are installed in the horizontal position.

An object of the invention is to provide a gas turbine or a combustion turbine inlet air filter arrangement, an inlet air filter cartridge, and equipment for supporting inlet air filter cartridges, in which at least some of the disadvantages of the prior art are minimized.

SUMMARY OF THE INVENTION

According to an aspect, the present invention provides an inlet air filter arrangement for a gas turbine or a combustion turbine, the arrangement comprising a housing with an inlet side and an outlet side separated by a planar tubesheet comprising multiple tubesheet openings, multiple cylindrical filter cartridges, each of the multiple cylindrical filter cartridges comprising a symmetry axis, an open end, and a closed end, and a connection assembly for each of the multiple cylindrical filter cartridges for sealing the open end of the cylindrical filter cartridge to the tubesheet around one of the tubesheet openings, wherein the connection assembly comprises a mainly cylindrical guide sleeve comprising a symmetry axis, a shell with a cylindrical external surface, an inner end attached around the tubesheet opening and an outer end at the inlet side of the housing, the shell being provided with at least two slots extending mainly helically from the outer end towards the inner end, a collar attached to the open end of the cylindrical filter cartridge, the collar having a cylindrical internal surface adapted to fit outside the cylindrical external surface of the shell of the guide sleeve, the cylindrical internal surface being provided with at least two protrusions extending from the internal surface of the collar towards the axis of the filter cartridge, wherein the at least two protrusions are adapted to fit to the at least two slots so as to allow connecting the collar to the guide sleeve, a tubesheet sealing surface arranged in the tubesheet or in the inner end of the guide sleeve so as to face to the inlet side of the housing, a filter cartridge sealing surface arranged in the open end of the cylindrical filter cartridge, and a circular sealing member, having, in a non-compressed state, a predetermined thickness, to be installed between the tubesheet sealing surface and the filter sealing surface for sealing the cylindrical filter cartridge to the tubesheet.

A main feature of the present invention is that it provides a low-cost filter supporting system by which the installation of the filters can be done in an especially simple way without the use of any tools. Thereby, a filter cartridge is installed to the tubesheet by setting the collar of the filter cartridge on a guide sleeve attached to the tubesheet opening and rotating the filter cartridge so as to attach and to seal the filter cartridge to the tubesheet.

The filter cartridges can be of any conventional type, such as conical or cylindrical cartridges, or combinations of these. According to an especially advantageous embodiment of the present invention, however, the filter cartridges are of a single piece and of a straight and a circular, cylindrical shape. In other words, each of the multiple tubesheet openings is advantageously sealed by a single piece cylindrical filter cartridge. The filter cartridges of the present invention are advantageously relatively short. The total overall length of the filter cartridges is preferably from seventy-five centimeters to one hundred centimeters, most preferably, about ninety-one centimeters (thirty-six inches). A filter cartridge usually comprises filter media consisting of synthetic or natural fibers between inner and outer cores made of steel, with a ring-like cap in the open end and a closed cap in the closed end.

Of the two main parts of the filter connecting system, the collar with studs and the guide sleeve with slots, the more complicated part, the guide sleeve with slots, is permanently attached to the tubesheet, and only the low-cost part, the collar with studs, is a part of the filter cartridge. Thus, the material costs and manufacturing costs of the replaceable filter cartridges are minimized.

The collar is advantageously a simple and structurally sturdy circular ring, which typically has a height of three to six centimeters. According to a preferred embodiment of the present invention, the collar is arranged within the inner diameter of the filter cartridge, i.e., it does not protrude out from the open end of the filter cartridge. Thus, the collar does not increase the length of the filter cartridge, which is important to keep the logistical costs of the filter cartridge replacement low. Also, due to the collar being within the body of the filter cartridge, the risk of damaging the filter cartridge during the transport of the filter cartridges is minimized, and also the associated safety hazards are minimized.

On the other hand, the guide sleeve attached to the tubesheet is also a small and simple device when compared to a conventional filter cartridge supporting structure in the form of a tripod or yoke, which has a length extending from the tubesheet to the closed end of the filter cartridge, typically, up to about 1.3 meters. The guide sleeve according to the present invention typically extends only five to seven centimeters from the tubesheet to the inlet side of the housing, i.e., the guide sleeve is considerably shorter than a conventional filter cartridge supporting structure. Thus, the material costs and manufacturing costs of the guide sleeve are clearly less than those of a conventional filter cartridge supporting structure. It is also significantly easier and quicker to install a filter cartridge to the guide sleeve than on a tripod or a yoke. It is thus nearly impossible to damage the filter cartridge with the guide sleeve during the installation, to the contrary, in the case when installing a filter cartridge on a tripod or yoke.

According to a preferred embodiment of the present invention, the at least two slots in the guide sleeve extend through the shell of the guide sleeve. In some cases, however, especially if the shells of the guide sleeves are relatively thick, the slots may be grooves at the cylindrical external surface of the shells, without extending through the shell.

The slots extend generally helically from the outer end of the guide sleeve towards the inner end of the guide sleeve. According to an advantageous embodiment of the present invention, each of the slots comprises an axially extending tapering portion at the outer end of the guide sleeve, which tapering portion is followed by a radially extending helical portion. When installing the filter cartridge, the axially extending tapering portion guides the filter cartridge, actually, the studs in the collar of the filter cartridge, to the beginning of the helical portion of the slot. The helical portion is advantageously linear in the sense that it extends from a first end to a second end so that the distance from the helical portion to the inner end of the guide sleeve decreases linearly from the first end to the second end. The helical portion extends advantageously an azimuth angle from about twenty degrees to about one hundred degrees, more preferably, from about thirty degrees to about sixty degrees, most preferably, about forty-five degrees. The helical portion of the slot has preferably a constant width, i.e., the helical portion has an inner edge towards the inner end of the guide sleeve and an outer edge towards the outer end of the guide sleeve, the distance from the inner edge to the outer edge being substantially constant.

The filter cartridge is sealed to the tubesheet by a sealing member arranged between the tubesheet sealing surface, arranged in the tubesheet or as an extension of the inner end of the guide sleeve, which guide sleeve is attached to the tubesheet, and the filter cartridge sealing surface, arranged in the open end of the cylindrical filter cartridge. When using the present invention, the sealing member is used in a conventional way, i.e., the circular sealing member is usually attached to the open end or, more particularly, to the ring-like cap at the open end, of the cylindrical filter cartridge. Usually, the sealing member, such as a rubber gasket, is bonded to the ring-like cap, which thus forms the filter sealing surface. The sealing member may alternatively be a separate element that is placed between the sealing surfaces before or during the installation, or the sealing member may even be pre-installed in the tubesheet around the guide sleeves before the filter replacement.

The protrusions in the collar are preferably relatively short stud-like elements. The points of the studs that are at the largest distance from the filter sealing surface form a so-called support surface that is at a predetermined distance, a so-called support distance, from the filter sealing surface. According to a preferred embodiment of the present invention, the distance from the tubesheet sealing surface to the outer edge of the first end of the helical portion is greater than the sum of the support distance and the thickness of the sealing member in a non-compressed state. This relation guarantees that the collar of the filter cartridge can be placed on the guide sleeve and rotated around the guide sleeve so far that the studs reach the helical portion of the slot without having to compress the sealing member. This makes the installation of the filter cartridges especially smooth and easy. Correspondingly, the distance from the tubesheet sealing surface to the outer edge of the helical portion in the second end of the helical portion is less than the sum of the support distance and the thickness of the sealing member in the non-compressed state. In practice, this means that the sealing member is compressed when rotating the studs in the helical portion of the slot, and a gas tight connection of the filter cartridge is obtained.

According to a preferred embodiment of the present invention, each of the at least two slots extends from the second end of the helical portion to a radially extending lock portion. The lock portion has an outer edge at a slightly greater distance from the tubesheet sealing surface than the outer edge of the helical portion in the second end of the helical portion. Still, the distance of the outer edge of the lock portion from the tubesheet sealing surface is less than the sum of the support distance and the thickness of the sealing member in a non-compressed state. When the filter cartridge is rotated around the guide sleeve so far that the studs reach the lock portion, the filter cartridge still remains sealed against the tubesheet, but the lock portion prevents inadvertent disconnecting of the filter cartridge from the tube sheet.

A minimum number of slots and studs for making the connection is two. In practice, the shell of the guide sleeve is usually provided with three slots extending mainly helically from the outer end of the guide sleeve towards the inner end of the guide sleeve, and the cylindrical internal surface of the collar is correspondingly provided with three protrusions extending from the internal surface of the collar towards the axis of the filter cartridge. In some cases, the number of slots and studs may be even greater than three, such as four. The three, or even more than three slots, and protrusions are advantageously arranged symmetrically about the symmetry axis of the guide sleeve and the filter cartridge, respectively.

According to another aspect, the present invention provides an inlet air filter cartridge for a gas turbine or a combustion turbine, the filter cartridge being of a cylindrical form and comprising a symmetry axis, an open end, a closed end, and a collar attached to the open end, the collar having a cylindrical internal surface provided with at least two protrusions extending from the internal surface towards the axis of the filter cartridge so as to enable twist-locking of the collar to a guide sleeve arranged around an opening in a tubesheet of a gas turbine or a combustion turbine inlet air filter arrangement.

The filter cartridge can be of any conventional type, such as a conical or a cylindrical cartridge, or a combination of these. According to an especially advantageous embodiment of the present invention, however, the filter cartridge is of a single piece and of a straight and a circular, cylindrical shape. The filter cartridges of the present invention are advantageously relatively short. The total overall length of the filter cartridges is preferably from seventy-five centimeters to one hundred centimeters, most preferably, about ninety-one centimeters (thirty-six inches). A filter cartridge usually comprises filter media consisting of synthetic or natural fibers between inner and outer cores made of steel, a ring-like cap in the open end, and a closed cap in the closed end.

The collar is advantageously a simple circular ring, which typically has a height of three to six centimeters. The protrusions in the collar are preferably relatively short stud-like elements. Thus, the material costs and manufacturing costs of the filter cartridges are minimized. According to a preferred embodiment of the present invention, the collar is arranged within the filter cartridge, i.e., it does not protrude out from the open end of the filter cartridge. Thus, the collar does not increase the length of the filter cartridge, which is important to keep the logistic costs of the filter cartridge replacement low. Also, due to the collar being within the body of the filter cartridge, the risk of damaging the filter cartridge during the transport of the filter cartridges is minimized, and also, the associated safety hazards are minimized.

The filter cartridge is to be sealed to the tubesheet by a circular sealing member arranged between a tubesheet sealing surface and a filter cartridge sealing surface, arranged in the open end of the cylindrical filter cartridge. The circular sealing member is usually attached to the open end or, more particularly, to the ring-like cap at the open end, of the cylindrical filter cartridge. Usually, the sealing member, such as a rubber gasket, is bonded to the ring-like cap, which thus forms the filter sealing surface.

According to a third aspect, the present invention provides equipment for supporting multiple inlet air filter cartridges for a gas turbine or a combustion turbine, the equipment comprising a housing with an inlet side and an outlet side separated by a planar tubesheet comprising multiple tubesheet openings, and a connection assembly for sealing a cylindrical filter cartridge to the tubesheet around each of the tubesheet openings, wherein the connection assembly comprises a mainly a cylindrical guide sleeve comprising a symmetry axis, a shell with a cylindrical external surface, the guide sleeve having an inner end attached around the tubesheet opening and an outer end at the inlet side of the housing, the shell being provided with at least two slots extending mainly helically from the outer end towards the inner end so as to enable twist-locking of a cylindrical filter cartridge collar to the guide sleeve for sealing the cylindrical filter cartridge to the tubesheet, and a tubesheet sealing surface arranged in the tubesheet or in the inner end of the guide sleeve so as to face to the inlet side of the housing for sealing the cylindrical filter cartridge to the tubesheet.

The guide sleeve attached to the tubesheet is a small and simple device when compared to a conventional filter cartridge supporting structure in the form of a tripod or a yoke, which has a length extending from the tubesheet to the closed end of the filter cartridge, typically, up to about 1.3 meters. The guide sleeve according to the present invention typically extends only five to seven centimeters from the tubesheet to the inlet side of the housing, i.e., the guide sleeve is considerably shorter than a conventional filter cartridge supporting structure. Thus, the material costs and manufacturing costs of the guide sleeve are clearly less than those of a conventional filter cartridge supporting structure. It is also significantly easier to install a filter cartridge to the guide sleeve than on a tripod or a yoke. It is thus nearly impossible to damage the filter cartridge with the guide sleeve during the installation, to the contrary, in the case when installing a filter cartridge on a tripod or a yoke.

According to a preferred embodiment of the present invention, the at least two slots in the guide sleeve extend through the shell of the guide sleeve. In some cases, however, especially, if the shells of guide sleeves are relatively thick, the slots may be grooves at the cylindrical external surface of the shells, without extending through the shell.

The slots extend generally helically from the outer end of the guide sleeve towards the inner end of the guide sleeve. According to an advantageous embodiment of the present invention, each of the slots comprises an axially extending tapering portion at the outer end of the guide sleeve, which tapering portion is followed by a radially extending helical portion. When installing a filter cartridge to the support guide sleeve, the axially extending tapering portion guides the filter cartridge to the beginning of the helical portion of the slot. The helical portion is advantageously linear in the sense that it extends from a first end to a second end so that the distance from the helical portion to the inner end of the guide sleeve decreases linearly from the first end to the second end. The helical portion advantageously extends an azimuth angle from about twenty degrees to about one hundred degrees, more preferably, from about thirty degrees to about sixty degrees, most preferably, about forty-five degrees. The helical portion of the slot preferably has a constant width, i.e., the helical portion has an inner edge towards the inner end of the guide sleeve and an outer edge towards the outer end of the guide sleeve, the distance from the inner edge to the outer edge being substantially constant.

According to a preferred embodiment of the present invention, the at least two slots extend from the second end of the helical portion to a radially extending lock portion. The lock portion has an outer edge at a slightly greater distance from the tubesheet sealing surface than the outer edge of the helical portion in the second end of the helical portion. The lock portion prevents inadvertent disconnecting of a filter cartridge from the tube sheet.

A minimum number of the slots is two, but, in practice, the shell of the guide sleeve is usually provided with three slots extending mainly helically from the outer end of the guide sleeve towards the inner end of the guide sleeve. In some cases, the number of slots may be even greater than three, such as four. The three, or even more than three slots, are advantageously arranged in the guide sleeves symmetrically about the symmetry axis of the guide sleeve.

The above brief description, as well as further objects, features, and advantages of the present invention will be more fully appreciated by reference to the following detailed description of the currently preferred, but nonetheless, illustrative, embodiments in accordance with the present invention, when taken in conjunction with the accompanying drawings.

DETAILED DESCRIPTION OF THE INVENTION

Figure 1:
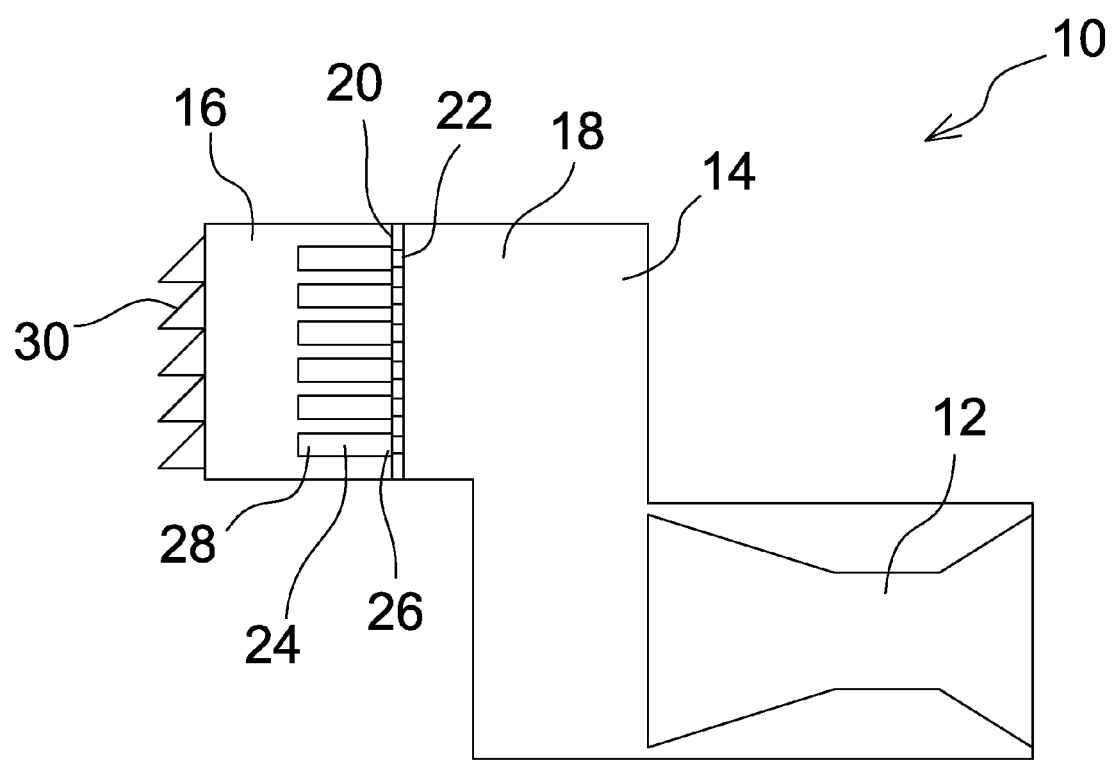
FIG. 1 schematically shows a gas turbine plant with an inlet filter arrangement.

FIG. 1 schematically depicts a gas turbine plant 10, comprising a gas turbine 12, a housing 14 with an inlet side 16 and an outlet side 18, separated by a vertically arranged planar tubesheet 20. The tubesheet 20 comprises multiple tubesheet openings 22, each of the tubesheet openings 22 being associated with a cylindrical filter cartridge 24 having an open end 26 sealed around the perimeter of the tubesheet opening 20 and a closed end 28 at the inlet side 16 of the housing 14. FIG. 1 also shows a weather hood 30, through which ambient air enters the inlet side of the housing 14. Dust and other particles in the inlet air are collected by the filter cartridges 24, and clean air is introduced into the gas turbine 12. In practice, the inlet air cleaning system may comprise different stages, but only one set of filter cartridges is shown here, which are typically used for high efficiency removal of relatively small particles from the stream of ambient air.

Figure 2:
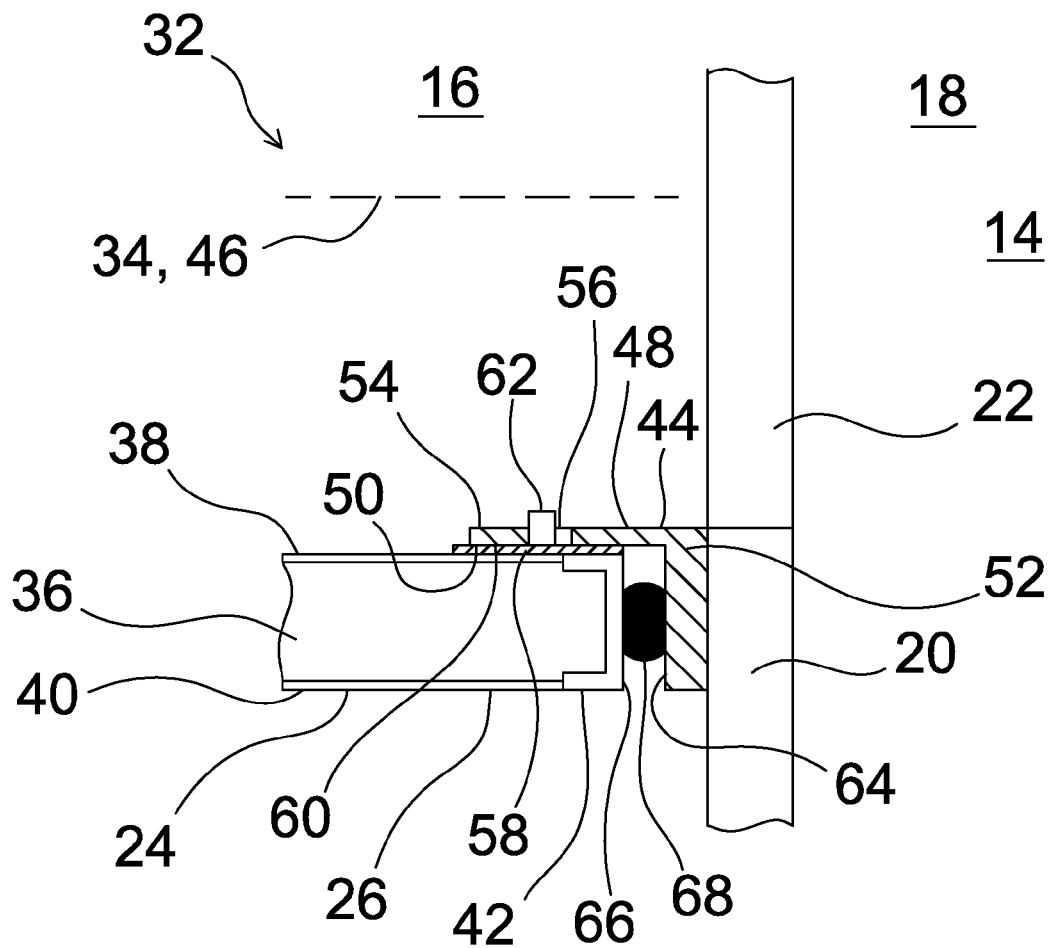
FIG. 2 schematically shows a cross section of a detail in a gas turbine inlet filter connection assembly.

FIG. 2 schematically shows a cross section of a detail in a gas turbine inlet filter connection assembly 32. FIG. 2 shows a part of an opening 22 formed in a vertical tubesheet 20 separating the inlet side 16 and outlet side 18 of a housing 14. Around the opening is connected a cylindrical filter cartridge 24, a portion of the open end 26 of the filter cartridge 24 and an axial symmetry axis 34 of the filter cartridge being shown in FIG. 2. The filter cartridge 24 comprises filter media 36, consisting of synthetic or natural fibers, between an inner core 38 and an outer core 40 made of steel, and a ring-like cap 42 in the open end 26 of the filter cartridge 24.

The connection assembly 32 comprises a mainly cylindrical guide sleeve 44 attached around the opening 22 in the tubesheet 20. The guide sleeve 44 has a symmetry axis 46, which coincides, when the filter cartridge 24 is installed, with the symmetry axis 34 of the filter cartridge 24. The guide sleeve 44 comprises a shell 48 with a cylindrical external surface 50. The guide sleeve 44 has an inner end 52 attached around the tubesheet opening 22, and an outer end 54 extending to the inlet side 16 of the housing 12. The shell 48 is provided with slots 56 extending helically from the outer end 54 towards the inner end 52.

A collar 58 is attached to the open end 26 of the cylindrical filter cartridge 24, within the filter cartridge 24. The collar 58 has a cylindrical internal surface 60 adapted to fit outside of the cylindrical external surface 50 of the guide sleeve 44. The cylindrical internal surface 50 of the collar 58 is provided with at least two stud-like protrusions 62 extending from the internal surface 60 of the collar 58 towards the axis 34 of the filter cartridge 24. The studs 62 of the collar 58 are adapted to fit to the slots 56 of the guide sleeve 44, to allow connecting the collar 58 to the guide sleeve 44.

A tubesheet sealing surface 64, facing the inlet side 16 of the housing 14, is arranged in a radial extension of the inner end 52 of the guide sleeve 44. Alternatively, the inner end of the guide sleeve 44 could be without a radial extension, or the radial extension could be smaller, and the tubesheet sealing surface 64 could be arranged directly on the tubesheet 20. Correspondingly, a filter cartridge sealing surface 66 is arranged in the end cap 42 of the filter cartridge 24, so as to allow sealing of the open end 26 of the filter cartridge 24 to the tubesheet 20 by a suitable circular sealing member, such as a rubber gasket 68, installed between the tubesheet sealing surface 64 and the filter cartridge sealing surface 66.

Figure 3:
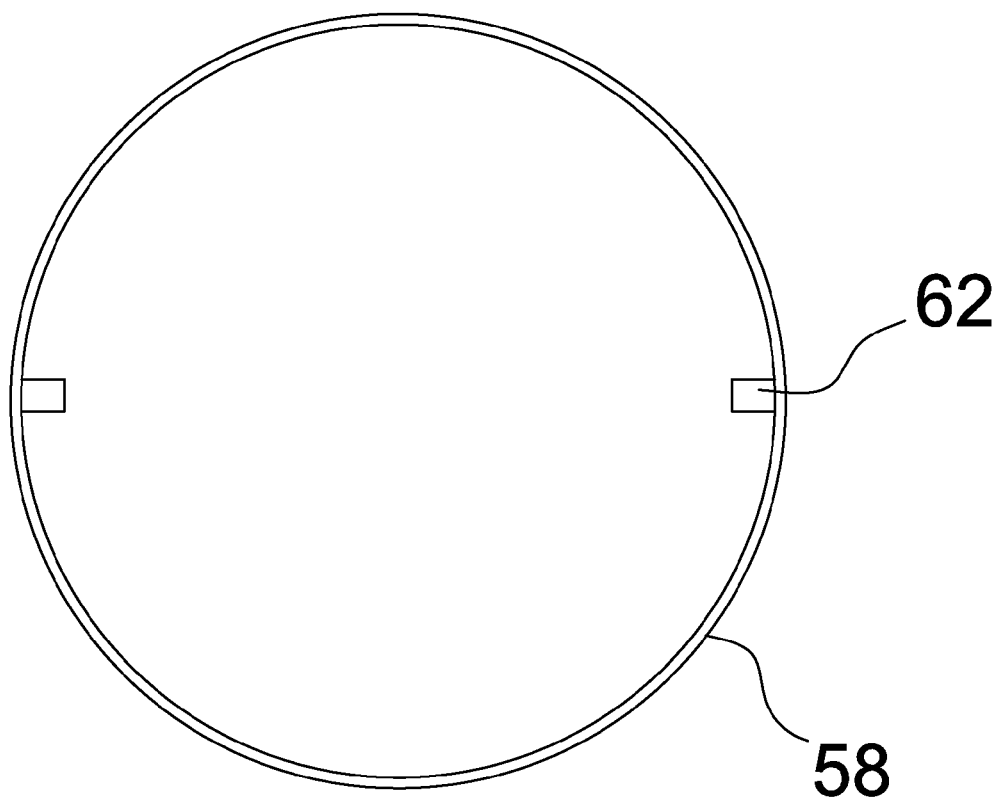
FIG. 3 shows a schematic top view of a collar of a gas turbine inlet filter arrangement.

FIG. 3 separately shows a top view of the collar 58 shown in FIG. 2. FIG. 3 shows two inwards extending studs 62, which are arranged symmetrically on two opposite sides of the collar 58. Alternatively, there could be three, or even more than three, studs 62 arranged symmetrically about the symmetry axis of the filter cartridge 24. The symmetry of the studs 62 naturally has to correspond to that of the slots 56 in the guide sleeve 44 in order to be able to connect the collar 58 to the guide sleeve 44.

Figure 4:
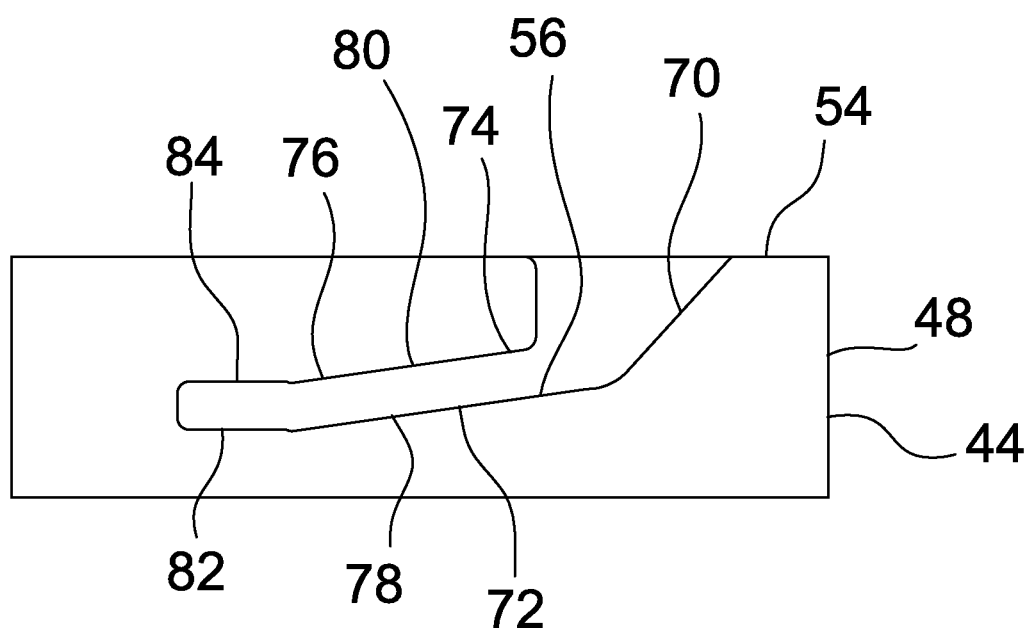
FIG. 4 shows a schematic side view of a guide shell of a gas turbine inlet filter arrangement.

FIG. 4 separately shows a side view of a cylindrical shell 48 of a guide sleeve 44. The shell 48 generally comprises at least two slots 56, only one of which is shown in FIG. 4. The slots 56 may extend radially through the shell 48 of the guide sleeve 44. Especially, when the shell 48 is relatively thick, the slots 56 may alternatively be grooves that have a sufficient depth, such as about one centimeter, from the external surface of the shell 48, but do not extend through the shell 48.

A tapering axially extending portion 70 of the slot 56 extends from the outer end 54 of the guide sleeve 44 towards the inner end of the guide sleeve 44. The tapering axially extending portion 70 leads to a radially extending helical portion 72 extending linearly from a first end 74 to a second end 76. The helical portion 72 of the slot 56 extends an azimuth angle of about forty-five degrees. Alternatively, the azimuth angle could be greater, such as about sixty degrees. Especially, when there are more than two slots 56 in the guide sleeve 44, the azimuth angle could be smaller than forty-five degrees, such as about thirty degrees. Advantageously, the helical portion has a constant width, i.e., the distance between the inner edge 78 and the outer edge 80 of the helical portion 72 of the slot 56 is constant.

The helical portion 72 of the slot 56 leads further to a radially extending lock portion 82. The outer edge 84 of the lock portion 82, i.e., the edge of the lock portion 82 towards the outer end 54 of the guide sleeve 44, is slightly closer to the outer end 54 of the guide sleeve 44 than the outer edge 80 of the helical portion 72 in the second end 76 of the helical portion 72. Thus, there is a kink in the outer edge of the slot 56, which provides the ability to lock a filter cartridge 24 to the guide sleeve 44.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

We claim:

1. An inlet air filter arrangement for a gas turbine or a combustion turbine, the arrangement comprising:
   (a) a housing with an inlet side and an outlet side separated by a planar tubesheet comprising multiple tubesheet openings;
   (b) multiple cylindrical filter cartridges, each of the multiple cylindrical filter cartridges comprising a symmetry axis, an open end, and a closed end; and
   (c) a connection assembly for each of the multiple cylindrical filter cartridges for sealing the open end of the cylindrical filter cartridge to the tubesheet around one of the tubesheet openings, wherein the connection assembly comprises:
      (i) a mainly cylindrical guide sleeve comprising a symmetry axis, a shell with a cylindrical external surface, an inner end attached around the tubesheet opening and an outer end at the inlet side of the housing, the shell being provided with at least two slots extending mainly helically from the outer end towards the inner end;
      (ii) a collar attached to the open end of the cylindrical filter cartridge, the collar having a cylindrical internal surface adapted to fit outside of the cylindrical external surface of the shell of the guide sleeve, the cylindrical internal surface being provided with at least two protrusions extending from the internal surface of the collar towards the axis of the filter cartridge, wherein the at least two protrusions are adapted to fit to the at least two slots so as to allow connecting the collar to the guide sleeve; and
      (iii) a tubesheet sealing surface arranged in the tubesheet or in the inner end of the guide sleeve so as to face to the inlet side of the housing, a filter cartridge sealing surface arranged in the open end of the cylindrical filter cartridge, and a circular sealing member, having, in a non-compressed state, a predetermined thickness, to be installed between the tubesheet sealing surface and the filter sealing surface for sealing the cylindrical filter cartridge to the tubesheet.

2. The inlet air filter arrangement according to claim 1, wherein the circular sealing member is attached to the open end of the cylindrical filter cartridge.

3. The inlet air filter arrangement according to claim 1, wherein the collar is arranged within the filter cartridge.

4. The inlet air filter arrangement according to claim 1, wherein the at least two slots are grooves at the cylindrical external surface of the shell and do not extend through the shell.

5. The inlet air filter arrangement according to claim 1, wherein each of the at least two slots extends from the outer end of the guide sleeve as a tapering axially extending portion to a radially extending helical portion, the helical portion extending from a first end to a second end so that the distance from the helical portion to the inner end of the guide sleeve decreases linearly from the first end to the second end.

6. The inlet air filter arrangement according to claim 5, wherein the helical portion extends at an azimuth angle from about twenty degrees to about one hundred degrees.

7. The inlet air filter arrangement according to claim 5, wherein the helical portion has an inner edge towards the inner end of the guide sleeve and an outer edge towards the outer end of the guide sleeve, the distance from the inner edge to the outer edge being substantially constant.

8. The inlet air filter arrangement according to claim 7, wherein the protrusions are studs, with the points of the studs being at a largest distance from the filter sealing surface forming a support surface at a predetermined distance, a so-called support distance, from the filter sealing surface, wherein the distance from the tubesheet sealing surface to the outer edge of the helical portion in the first end of the helical portion is greater than the sum of the support distance and the thickness of the sealing member in a non-compressed state, and the distance from the tubesheet sealing surface to the outer edge of the helical portion in the second end of the helical portion is less than the sum of the support distance and the thickness of the sealing member in the non-compressed state.

9. The inlet air filter arrangement according to claim 8, wherein each of the at least two slots extends from the second end of the helical portion to a radially extending lock portion, the lock portion having an outer edge towards the outer end of the guide sleeve, wherein the distance from the tubesheet sealing surface to the outer edge of the lock portion is greater than the distance from the tubesheet sealing surface to the outer edge of the helical portion in the second end of the helical portion, and is less than the sum of the support distance and the thickness of the sealing member in a non-compressed state.

10. The inlet air filter arrangement according to claim 1, wherein the shell of the guide sleeve is provided with at least three slots extending helically from the outer end of the guide sleeve towards the inner end of the guide sleeve, and the cylindrical internal surface of the collar is provided with at least three protrusions extending from the internal surface of the collar towards the axis of the filter cartridge.

11. The inlet air filter arrangement according to claim 10, wherein the at least three slots and protrusions are arranged symmetrically about the symmetry axis of the guide sleeve.

12. The inlet air filter arrangement according to claim 1, wherein the cylindrical filter cartridges are single piece straight cartridges.

13. Equipment for supporting multiple air filter cartridges for a gas turbine or a combustion turbine, the equipment comprising:
   (a) a housing with an inlet side and an outlet side separated by a planar tubesheet comprising multiple tubesheet openings; and
   (b) a connection assembly for sealing a cylindrical filter cartridge to the tubesheet around each of the tubesheet openings, wherein the connection assembly comprises:
      (i) a mainly cylindrical guide sleeve comprising a symmetry axis, a shell with a cylindrical external surface, the guide sleeve having an inner end attached around the tubesheet opening and an outer end at the inlet side of the housing, the shell being provided with at least two slots extending mainly helically from the outer end towards the inner end so as to enable twist-locking of a cylindrical filter cartridge collar to the guide sleeve for sealing the cylindrical filter cartridge to the tubesheet, wherein the at least two slots are grooves at the cylindrical external surface of the shell and do not extend through the shell; and
      (ii) a tubesheet sealing surface arranged in the tubesheet or in the inner end of the guide sleeve so as to face to the inlet side of the housing for sealing the cylindrical filter cartridge to the tubesheet.

14. The equipment according to claim 13, wherein each of the at least two slots extends from the outer end of the guide sleeve as a tapering axially extending portion to a radially extending helical portion, the helical portion extending from a first end to a second end so that the distance from the helical portion to the inner end of the guide sleeve decreases linearly from the first end to the second end.

15. The equipment according to claim 14, wherein the helical portion extends at an azimuth angle from about twenty degrees to about one hundred degrees.

16. The equipment according to claim 14, wherein the helical portion has an inner edge towards the inner end of the guide sleeve and an outer edge towards the outer end of the guide sleeve, the distance from the inner edge to the outer edge being substantially constant.

17. The equipment according to claim 16, wherein each of the at least two slots extends from the second end of the helical portion to a radially extending lock portion, the lock portion having an outer edge towards the outer end of the guide sleeve, wherein the distance from the tubesheet sealing surface to the outer edge of the lock portion is greater than the distance from the tubesheet sealing surface to the outer edge of the helical portion in the second end of the helical portion.

\* \* \* \* \*